United States Patent
Kim et al.

(10) Patent No.: US 7,413,252 B2
(45) Date of Patent: Aug. 19, 2008

(54) MOTOR VEHICLE SEAT LIFT ASSEMBLY

(75) Inventors: Hyunkyu Kim, Gravenhurst (CA); Sung-Joon Kim, Bracebridge (CA); Sebastien Stephane Cabrit, Washago (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 31 days.

(21) Appl. No.: 11/385,019

(22) Filed: Mar. 20, 2006

(65) Prior Publication Data

US 2007/0216210 A1   Sep. 20, 2007

(51) Int. Cl.
  *A47C 1/00*  (2006.01)
(52) U.S. Cl. .............................. 297/344.15; 297/344.17
(58) Field of Classification Search ............ 297/344.15, 297/344.17; 248/421, 429
See application file for complete search history.

(56) References Cited

U.S. PATENT DOCUMENTS

| 2,930,428 | A | * | 3/1960 | De Rose ..................... 248/394 |
| 2,942,647 | A | * | 6/1960 | Pickles ........................ 248/394 |
| 3,596,982 | A | * | 8/1971 | Grams .......................... 297/71 |
| 4,738,427 | A | * | 4/1988 | Nishino ...................... 248/421 |
| 4,993,678 | A | * | 2/1991 | Easter ......................... 248/371 |
| 5,882,061 | A | * | 3/1999 | Guillouet ................. 296/65.05 |
| 6,425,557 | B1 | * | 7/2002 | Becker et al. ............... 248/157 |
| 6,464,193 | B1 | | 10/2002 | Nemoto |
| 6,484,995 | B1 | * | 11/2002 | Nemoto ...................... 248/421 |
| 6,666,508 | B1 | | 12/2003 | Hofmann et al. |

* cited by examiner

*Primary Examiner*—Sarah B McPartlin
(74) *Attorney, Agent, or Firm*—Gregory J. Cohan; Banner & Witcoff, Ltd.; Dean B. Watson

(57) ABSTRACT

A motor vehicle seat lift assembly includes a seat pan and a seat frame positioned beneath the seat pan. Each of a pair of first linking members has a first end pivotally secured to the seat pan and a second end pivotally secured to the seat frame. Each of a pair of second linking members has a first end pivotally secured to the seat pan and a second end pivotally secured to the seat frame. A pinion gear is rotatable with respect to the seat pan. An actuator is operably connected to the pinion gear. A rack member has a plurality of teeth, with the pinion gear meshing with the teeth of the rack member. A first end of the rack member is pivotally secured to the first end of one of the first linking members and a second end of the rack member is slidably connected to the seat pan.

18 Claims, 5 Drawing Sheets

MOTOR VEHICLE SEAT LIFT ASSEMBLY

FIELD OF THE INVENTION

This invention relates generally to a motor vehicle seat lift assembly, and, in particular, to a motor vehicle seat lift assembly with an improved configuration.

BACKGROUND OF THE INVENTION

Seat lift assemblies for motor vehicles are well known for providing a user with the ability to raise and lower their seat to a desired height. Such seat lift assemblies can be manually driven, for example, with a handle and accompanying ratchet mechanism. Other seat lift assemblies are actuated by an electric motor.

It would be desirable to provide a motor vehicle seat lift assembly that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide an improved seat lift assembly. In accordance with a first aspect, a motor vehicle seat lift assembly includes a seat pan and a seat frame (often referred to as a slide assembly or track assembly), positioned beneath the seat pan. Each of a pair of first linking members has a first end pivotally secured to the seat pan and a second end pivotally secured to the seat frame. Each of a pair of second linking members has a first end pivotally secured to the seat pan and a second end pivotally secured to the seat frame. A pinion gear is rotatable with respect to the seat pan. An actuator is operably connected to the pinion gear. A rack member has a plurality of teeth, with the pinion gear meshing with the teeth of the rack member. A first end of the rack member is pivotally secured to the first end of one of the first linking members and a second end of the rack member is slidably connected to the seat pan.

In accordance with another aspect, a motor vehicle seat lift assembly includes a seat pan having a first seat pan member and a second seat pan member spaced from the first seat pan member. A seat frame is positioned beneath the seat pan and has a first seat frame member and a second seat frame member spaced from the first seat frame member. Each of a pair of first linking members has a first end pivotally secured to the seat pan and a second end pivotally secured to the seat frame. Each of a pair of second linking members has a first end pivotally secured to the seat pan and a second end pivotally secured to the seat frame. A pinion gear is rotatable with respect to the seat pan and an actuator is operably connected to the pinion gear. A rack member has a plurality of teeth, with the pinion gear meshing with the teeth of the rack member, a first end of the rack member being pivotally secured to one of the first linking members and a second end of the rack member slidably connected to the seat pan. The pinion gear is positioned at a forward end of the teeth of the rack member when the seat pan is in a first fully lowered condition with respect to the seat frame and at a rear end of the teeth of the rack member when the seat pan is in a second fully raised condition with respect to the seat frame.

In accordance with a further aspect, a motor vehicle seat lift assembly includes a seat frame having a first frame member and a second frame member spaced from the first frame member. A seat pan is movable with respect to the seat frame and has a first seat pan member and a second seat pan member spaced from the second seat pan member. A rack member has a plurality of teeth, with a first end pivotally secured to one of the first linking members. A pinion gear meshes with the teeth of the rack member. An actuator is operably connected to the pinion gear. Each of a pair of first linking members has a first end pivotally secured to one of the first seat pan member and the second seat pan member, and a second end pivotally secured to one of the first seat frame member and the second seat frame member. Each of a pair of second linking members has a first end pivotally secured to the other of the first seat pan member and the second seat pan member, and a second end pivotally secured to the other of the first seat frame member and the second seat frame member.

Substantial advantage is achieved by providing a motor vehicle seat lift assembly. In particular, certain embodiments of the seat lift assembly provide a more compact and less complex mechanism, resulting in time and material savings during manufacture and assembly.

These and additional features and advantages disclosed here will be further understood from the following detailed disclosure of certain embodiments.

Figure 1:
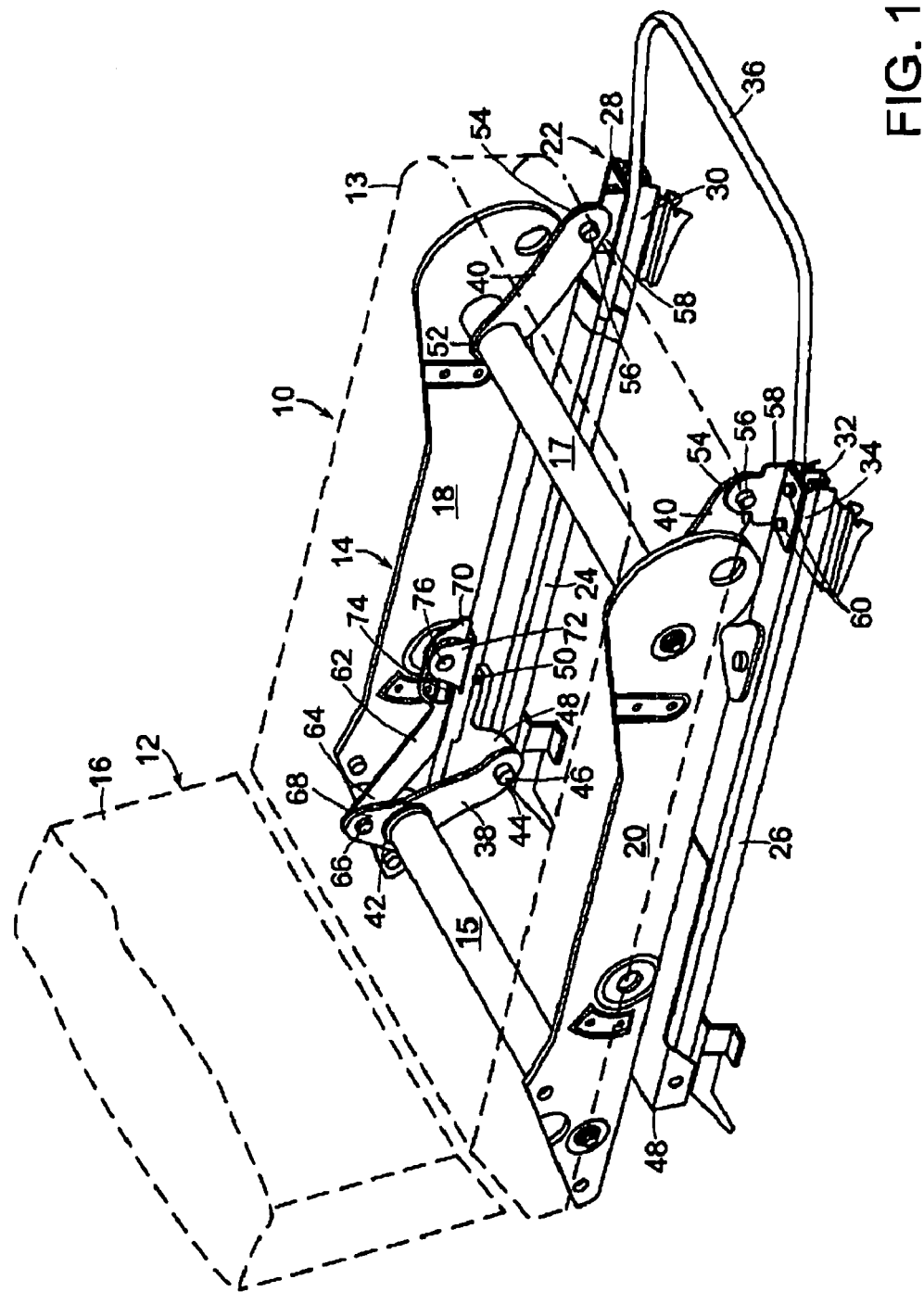
FIG. 1 is a right side perspective view of a seat lift assembly in a first, lowered condition.

The figures referred to above are not drawn necessarily to scale and should be understood to provide a representation of the invention, illustrative of the principles involved. Some features of the motor vehicle seat lift assembly depicted in the drawings have been enlarged or distorted relative to others to facilitate explanation and understanding. The same reference numbers are used in the drawings for similar or identical components and features shown in various alternative embodiments. Motor vehicle seat lift assemblies as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of a seat lift assembly 10 for a motor vehicle seat 12 is shown in FIG. 1. Vehicle seat 12 has a seat pan 14, upon which a seat cushion 13 is positioned, and a seat back 16. Seat back 16 is pivotally secured to seat pan 14 by a hinge assembly (not shown) so that seat back 16 can be folded forwardly and rearwardly with respect to seat pan 14 in known fashion.

Unless otherwise stated, or otherwise clear from the context below, directional terms used herein, such as left, right, rearwardly, forwardly, top, bottom, inwardly, downwardly, upwardly, etc., refer to directions relative to seat lift assembly 10 as it is positioned in a motor vehicle in an installed condition. However, it is to be appreciated that seat lift assembly 10 need not be limited to such an orientation. Thus, in the illustrated embodiment of FIG. 1, rearwardly is toward to the left as seen in FIG. 1. Naturally, forwardly is toward the right as seen in FIG. 1. Left refers to a direction into the page while right refers to a direction heading away from or out of the page as seen in FIG. 1.

Seat pan 14 is formed of a first seat pan member 18 and an opposed second seat pan member 20, often referred to as side members. In the illustrated embodiment, first seat pan member 18 is positioned to the left, with second seat pan member 20 positioned to the right. In certain embodiments, first and second pan members 18, 20 are metal plates, extending vertically from one edge thereof. It is to be appreciated that seat pan 14 can have any desired configuration and can be formed of any desired material. Thus, in certain embodiments, seat pan 14 could be formed of a single unitary member rather than two separate seat pan members, or it could be formed of more than two separate seat pan members.

A first connecting member 15 is connected at opposed ends thereof to first seat pan member 18 and second seat pan member 20 proximate a rear of seat pan 14. In certain embodiments, first connecting member 15 is a substantially cylindrical rod. Similarly, a second connecting member 17 is connected at opposed ends thereof to first seat pan member 18 and second seat pan member 20 proximate a front of seat pan 14. In certain embodiments, second connecting member 17 is a substantially cylindrical rod.

A seat frame 22, often referred to as a slide assembly or a track assembly, is positioned beneath seat pan 14, and is formed of a first seat frame member 24, positioned on the left in this embodiment, and a second seat frame member 26, positioned on the right in this embodiment. In the illustrated embodiment, first seat frame member 24 is formed of a first stationary rail 28 and a second movable rail 30, which slidingly engages first rail 28 in known fashion to allow seat pan 14 to be moved forward and backward. Similarly, second seat frame member 26 is formed of a first stationary rail 32 and a second movable rail 34, which slidingly engages first rail 32. The forward and backward movement of seat pan 14 is controlled by way of a handle or towel bar 36 in known fashion.

It is to be appreciated that seat frame 22 can have any desired configuration and can be formed of any desired material. Thus, in certain embodiments, seat frame 22 could be formed of a single unitary member rather than two separate seat frame members, or it could be formed of more than two separate seat frame members.

Seat lift assembly 10 includes a pair of first linking members 38 and a pair of second linking members 40. First linking members 38 are pivotally secured at first ends 42 thereof to seat pan 14 and at second ends 44 thereof to seat frame 22. In the illustrated embodiment, first ends 42 are pivotally secured about first connecting member 15, and second ends 44 are pivotally connected by way of a pin 46 to a mounting bracket 48 that is secured to seat frame 22 by fasteners such as bolts 50 or other suitable fasteners.

Similarly, second linking members 40 are pivotally secured at first ends 52 thereof to seat pan 14 and at second ends 54 thereof to seat frame 22. In the illustrated embodiment, first ends 52 are pivotally secured about second connecting member 17 and second ends 54 are pivotally connected by way of a pin 56 to a mounting bracket 58 that is secured to seat frame 22 by fasteners such as bolts 60 or other suitable fasteners.

A rack member 62 is pivotally secured at a first end 64 thereof to first end 42 of first linking member 38, remote from second end 44, by way of a pin 66. In the illustrated embodiment, a flange 68 is formed at first end 42 of first linking member 38, with pin 66 pivotally securing rack member 62 to flange 68. A second end 70 of rack member 62 is slidably connected to seat pan 14. In certain embodiments, second end 70 slides along a bracket 72.

Figure 2:
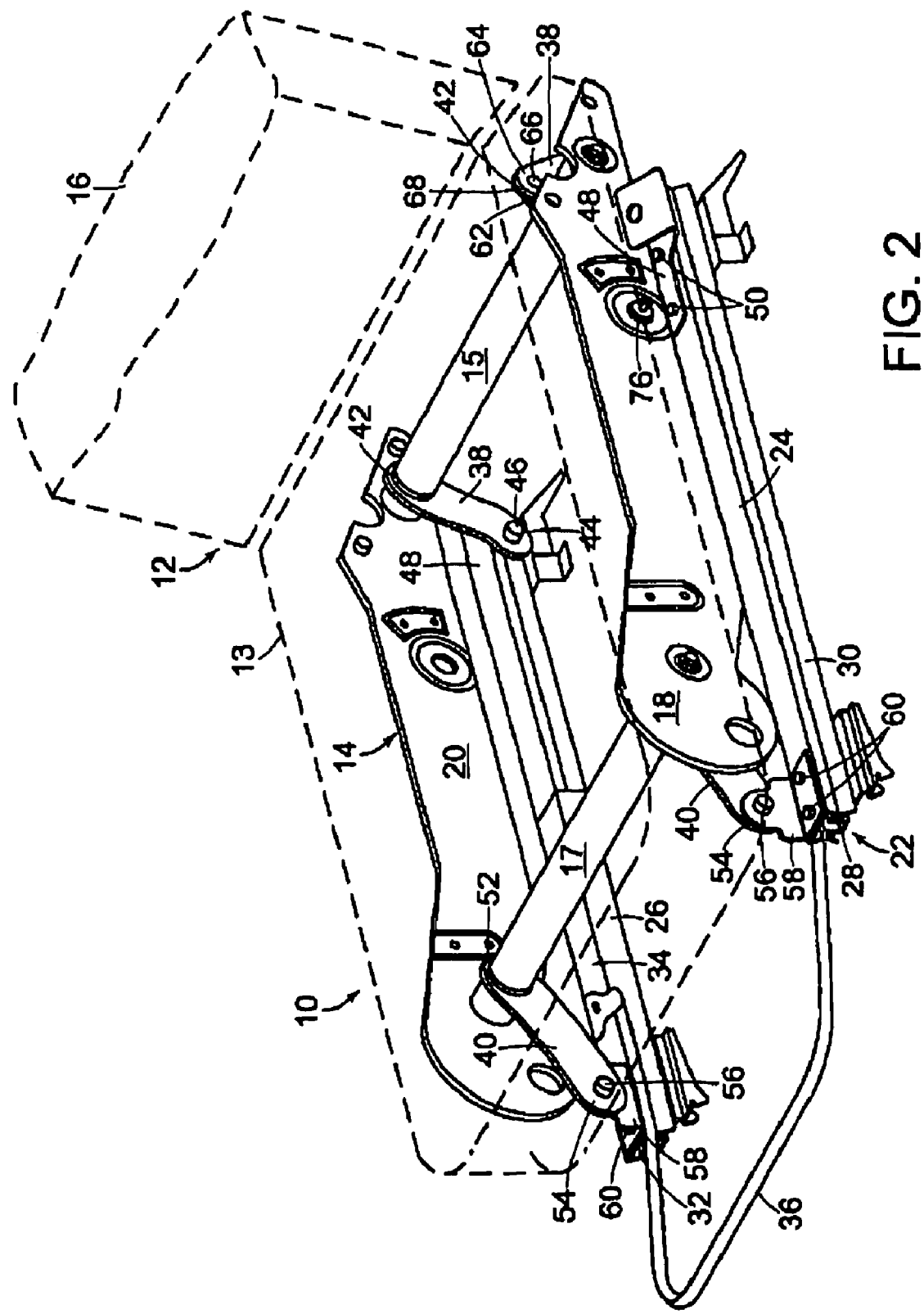
FIG. 2 is a left side perspective of the seat lift assembly of FIG. 1.

Rack member 62 includes a plurality of teeth 74. A pinion gear 76 engages teeth 74, thereby driving rack member 62. Seat assembly 10 is shown in FIGS. 1-2 with seat pan 14 in its first fully lowered condition with respect to seat frame 22, with pinion gear 76 seated at a forward end of teeth 74 of rack member 62. Upon rotation of pinion gear 76 (in a counterclockwise direction as seen in FIG. 1 and a clockwise direction as seen in FIG. 2), rack member 62 is driven forwardly with respect to pinion gear 76. The forward movement of rack member 62 causes first end 42 of left first linking member 38 to move forward as well, since flange 68 on first end 42 is connected by pin 66 to rack member 62. Since second end 44 of left first linking member 38 is pivotally connected to first seat frame member 24, first seat pan member 18 is driven upwardly, thereby raising seat pan 14 of seat assembly 10 to its fully raised condition with respect to seat frame 22, shown in FIG. 3, with pinion gear 76 being seated at a rear end of teeth 74 of rack member 62. First connecting member 15, being secured to left first linking member 38 and right first linking member 38, causes second seat pan member 20 to be driven upwardly simultaneously with first seat pan member 18.

Second linking members 40, which are connected to first and second seat pan members 18, 20 by way of second connecting member 17, are driven upwardly as well as rack member 62 is driven forwardly, helping support the forward portion of seat pan 14. Specifically, as second linking members 40 pivot upwardly about second ends 54, first ends 52, which are connected to first and second seat pan members 18, 20 by way of second connecting member 40 are driven upwardly, thereby helping raise seat pan 14 of seat assembly 10.

Figure 3:
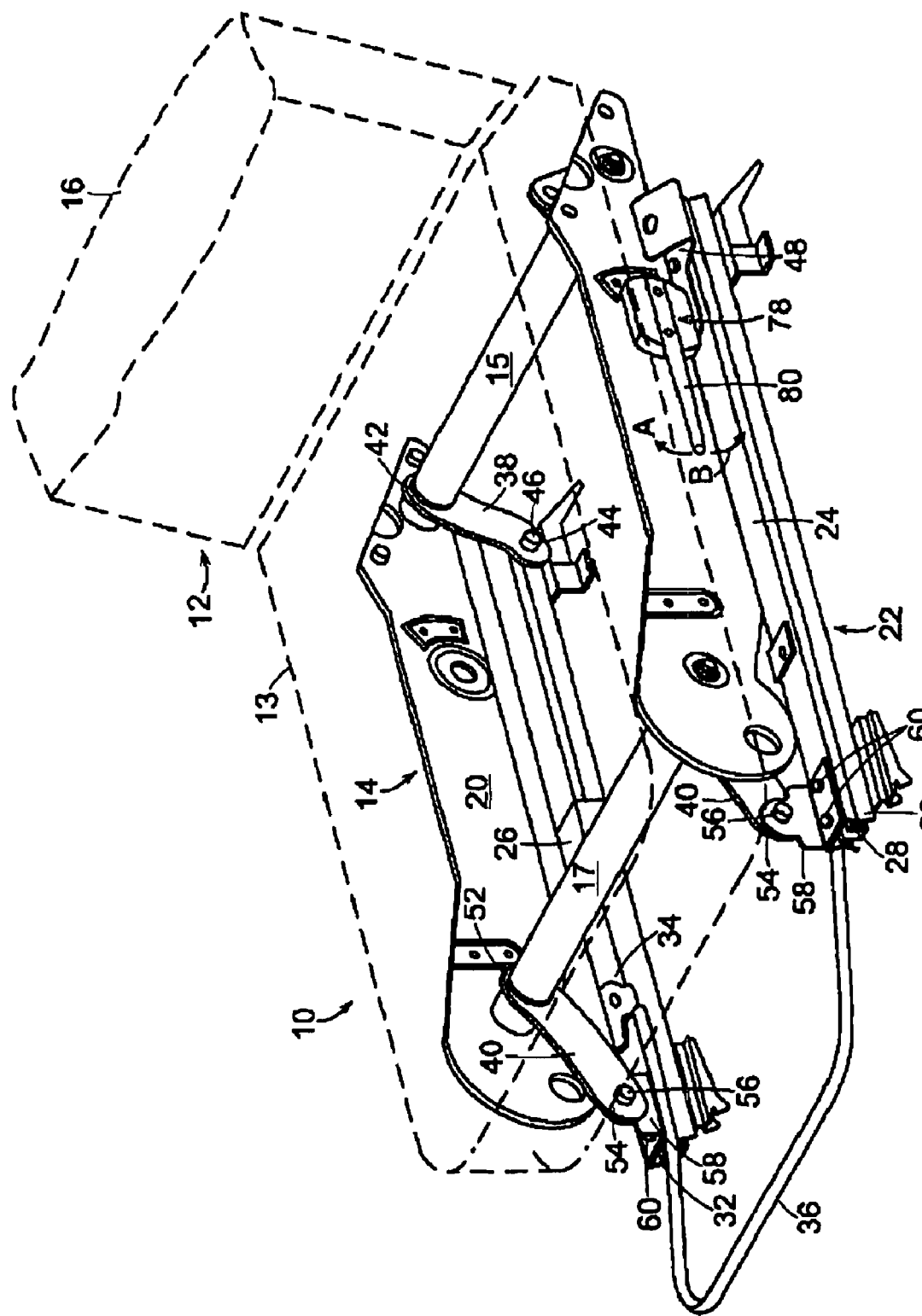
FIG. 3 is a left side perspective of the seat lift assembly of FIG. 1, shown with an actuator for activating the seat lift assembly.
Figure 4:
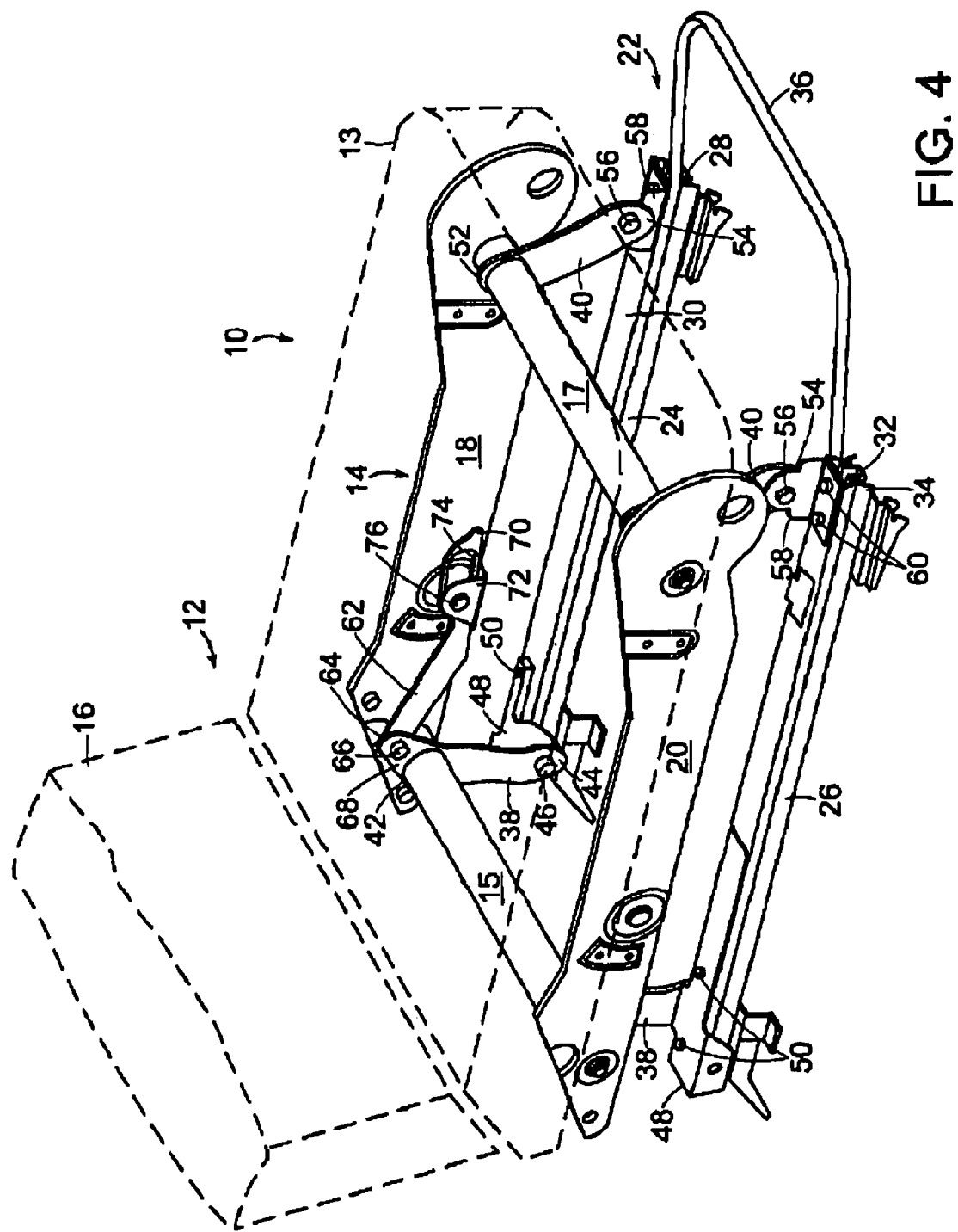
FIG. 4 is a right side perspective view of a seat lift assembly in a second, raised condition.

Pinion gear 76 is rotatably driven by an actuator 78, which is shown in the embodiment illustrated in FIG. 3 as a manually operated ratchet-driven actuator having a handle 80. The user can raise and lower seat pan 14 in known fashion by pumping handle 80. By pumping handle 80 repeatedly upwardly from its neutral position shown in FIG. 3 in the direction of arrow A, the user can easily raise seat pan 14 to a desired level. Similarly, by pumping handle 80 repeatedly downwardly from its neutral position in the direction of arrow B the user can also easily lower seat pan 14 to a desired level. Such pump-actuated ratchet mechanisms are well known to those skilled in the art and no further description need be provided here.

The connection of rack member 62 to flange 68 of first linking member 38, remote from second end 44, allows actuator 78 to be positioned toward the rear of vehicle seat 12, which is more convenient to the user, allowing ease of operation of seat lift assembly 10.

Figure 5:
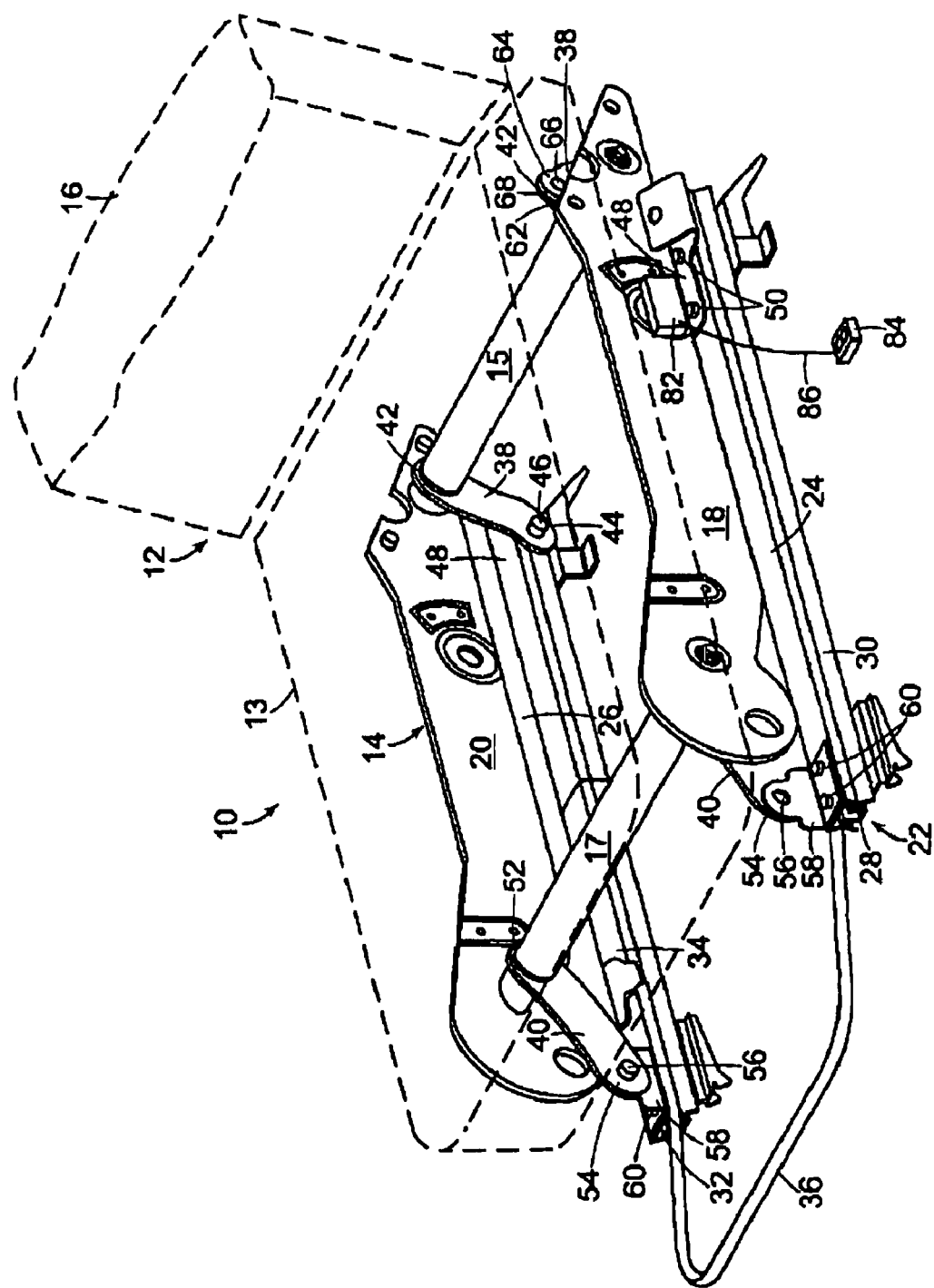
FIG. 5 is a left side perspective of the seat lift assembly of FIG. 1, shown with a motor for activating the seat lift assembly.

In another embodiment, shown in FIG. 5, pinion gear 76 is rotatably driven by a motor 82, which may be mounted to first seat pan member 18. The user can actuate motor 82 to raise and lower seat pan 14 by depressing a button 84, which is connected by a cable 86 or other suitable means for transmitting a signal to motor 82. Button 84 can be mounted to a side of seat cushion 15, to seat frame member 22, to the floor of the motor vehicle, on the door of the vehicle, or in any other desired location.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. A motor vehicle seat lift assembly comprising, in combination:
    a seat pan;
    a seat frame positioned beneath the seat pan;
    a pair of first linking members, each first linking member having a first end pivotally secured to the seat pan and a second end pivotally secured to the seat frame;
    a pair of second linking members, each second linking member having a first end pivotally secured to the seat pan and a second end pivotally secured to the seat frame;
    a pinion gear rotatable with respect to the seat pan;
    an actuator operably connected to the pinion gear;
    a rack member having a plurality of teeth, the pinion gear meshing with the teeth of the rack member, a first end of the rack member being secured to and pivoting about the first end of one of the first linking members and a second end of the rack member slidably connected to the seat pan the rack member being otherwise free of any pivotal connection to the seat pan and the seat frame.

2. The motor vehicle seat lift assembly of claim 1, wherein the seat pan comprises:
    a first seat pan member;
    a second seat pan member spaced from the first seat pan member;
    a first connecting member secured at a first end thereof to the first seat pan member and at a second end thereof to the second seat pan member; and
    a second connecting member secured at a first end thereof to the first seat pan member and at a second end thereof to the second seat pan member.

3. The motor vehicle seat lift assembly of claim 2, wherein the first ends of the first linking members are pivotally secured to the first connecting member and the first ends of the second linking members are pivotally secured to the second connecting member.

4. The motor vehicle seat lift assembly of claim 1, wherein the actuator comprises a manually actuated pump mechanism.

5. The motor vehicle seat lift assembly of claim 1, wherein the actuator comprises a motor.

6. The motor vehicle seat lift assembly of claim 1, further comprising a rack holding member secured to the seat pan, the rack member being movable along the rack holding member.

7. The motor vehicle seat lift assembly of claim 1, wherein the seat frame comprises a first frame member and a second frame member, the second end of one of the first linking members and the second end of one of the second linking members being pivotally connected to the first frame member, and the second end of the other of the first linking members and the second end of the other of the second linking members being pivotally connected to the second frame member.

8. The motor vehicle seat lift assembly of claim 1, wherein when the pinion gear is positioned at a forward end of the teeth of the rack member the seat pan is in a first fully lowered condition.

9. The motor vehicle seat lift assembly of claim 1, wherein when the pinion gear is positioned at a rear end of the teeth of the rack member, the seat pan is in a second fully raised condition.

10. A motor vehicle seat lift assembly comprising, in combination:
    a seat pan having a first seat pan member and a second seat pan member spaced from the first seat pan member;
    a seat frame positioned beneath the seat pan and having a first seat frame member and a second seat frame member spaced from the first seat frame member;
    a pair of first linking members, each first linking member having a first end pivotally secured to the seat pan and a second end pivotally secured to the seat frame;
    a pair of second linking members, each second linking member having a first end pivotally secured to the seat pan and a second end pivotally secured to the seat frame;
    a pinion gear rotatable with respect to the seat pan;
    an actuator operably connected to the pinion gear;
    a rack member having a plurality of teeth, the pinion gear meshing with the teeth of the rack member, a first end of the rack member being secured to and pivoting about the first end of one of the first linking members and a second end of the rack member slidably connected to the seat pan the rack member being otherwise free of any pivotal connection to the seat pan and the seat frame, the pinion gear being positioned at a forward end of the teeth of the rack member when the seat pan is in a first fully lowered condition with respect to the seat frame and at a rear end of the teeth of the rack member when the seat pan is in a second fully raised condition with respect to the seat frame.

11. The motor vehicle seat lift assembly of claim 10, wherein the seat pan includes a first connecting member secured at a first end thereof to the first seat pan member and at a second end thereof to the second seat pan member; and a second connecting member secured at a first end thereof to the first seat pan member and at a second end thereof to the second seat pan member.

12. The motor vehicle seat lift assembly of claim 10, wherein the actuator comprises a manually actuated pump mechanism.

13. The motor vehicle seat lift assembly of claim 10, wherein the actuator comprises a motor.

14. A motor vehicle seat lift assembly comprising, in combination:
    a seat frame having a first frame member and a second frame member spaced from the first frame member;
    a seat pan movable with respect to the seat frame and having a first seat pan member and a second seat pan member spaced from the first seat pan member;
    a pair of first linking members, each first linking member having a first end pivotally secured to one of the first seat pan member and the second seat pan member, and a second end pivotally secured to one of the first seat frame member and the second seat frame member;
    a pair of second linking members, each second linking member having a first end pivotally secured to the other of the first seat pan member and the second seat pan member, and a second end pivotally secured to the other of the first seat frame member and the second seat frame member;

a rack member having a plurality of teeth, a first end secured to and pivoting about the first end of one of the first linking members the rack member being otherwise free of any pivotal connection to the seat pan and the seat frame;

a pinion gear meshing with the teeth of the rack member; and an actuator operably connected to the pinion gear.

15. The motor vehicle seat lift assembly of claim 14, wherein the actuator comprises a manually actuated pump mechanism.

16. The motor vehicle seat lift assembly of claim 14, wherein the actuator comprises a motor.

17. The motor vehicle seat lift assembly of claim 14, wherein when the pinion gear is positioned at a forward end of the teeth of the rack member the seat pan is in a first fully lowered condition.

18. The motor vehicle seat lift assembly of claim 14, wherein when the pinion gear is positioned at a rear end of the teeth of the rack member when the seat pan is in a second fully raised condition.

* * * * *